(12) United States Patent
Mills

(10) Patent No.: US 9,197,607 B2
(45) Date of Patent: Nov. 24, 2015

(54) ENHANCING NETWORK SECURITY

(71) Applicant: Yahoo! Inc., Sunnyvale, CA (US)

(72) Inventor: William J. Mills, Castro Valley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 97 days.

(21) Appl. No.: 13/968,314

(22) Filed: Aug. 15, 2013

(65) Prior Publication Data

US 2015/0052586 A1    Feb. 19, 2015

(51) Int. Cl.
*H04L 29/06*   (2006.01)

(52) U.S. Cl.
CPC ............ *H04L 63/0428* (2013.01); *H04L 63/08* (2013.01); *H04L 63/04* (2013.01)

(58) Field of Classification Search
CPC . H04L 63/08; H04L 63/1441; H04L 63/1466; G06F 21/6218; G06F 21/44
USPC .......................................................... 726/4
See application file for complete search history.

(56) References Cited

U.S. PATENT DOCUMENTS

| | | | |
|---|---|---|---|
| 7,694,335 B1 * | 4/2010 | Turner et al. ..................... 726/14 |
| 2007/0245137 A1 * | 10/2007 | Bhagat et al. .................. 713/153 |
| 2011/0225234 A1 * | 9/2011 | Amit et al. ..................... 709/203 |
| 2013/0086679 A1 * | 4/2013 | Beiter ............................ 726/22 |
| 2013/0290735 A1 * | 10/2013 | Rombouts ...................... 713/189 |
| 2014/0136834 A1 * | 5/2014 | Sherkin et al. ................. 713/151 |

* cited by examiner

*Primary Examiner* — Harunur Rashid
(74) *Attorney, Agent, or Firm* — Berkeley Law & Technology Group, LLP

(57) ABSTRACT

Briefly, embodiments of methods or systems for providing enhancements to network security are disclosed.

20 Claims, 5 Drawing Sheets

ENHANCING NETWORK SECURITY

BACKGROUND

1. Field

This disclosure relates to enhancing network security, especially as it pertains to preventing unauthorized users from gaining access devices, for example, by exploiting one or more compression techniques used in transmitting encrypted messages.

2. Information

In a computing network, computing devices may securely communicate with one another by way of encrypted messages, which may be defined as one or more electrical signals that has been modulated to convey information and encoded by way of an encrypting polynomial. Encrypted messages may be communicated using wired or wireless channels, among computing devices of the network. This may allow computing devices to communicate in a secure manner over publicly accessible networks. In general, more sensitive content may be encrypted using more sophisticated encryption techniques, and less sensitive content may be encrypted using simpler techniques. Accordingly, the public Internet, for example, may be used to convey common, publicly available materials as well as encrypted highly sensitive content such as financial content, trade secrets, confidential medical content, and so forth, with manageable risk of compromising content of encrypted messages.

At times, encrypted messages transmitted among computing devices may undergo compression, which may permit a reduction in communications network bandwidth consumed by transmitting messages. Accordingly, compression may allow a large number of users to access communications networks at a low cost to the user and/or the services provider. However, use of compression techniques, if used in conjunction with one or more encryption techniques, may give rise to security concerns. For example, an unscrupulous user may glean a secure password, a secure cookie, or the like, by observing characteristics of encrypted messages transmitted from a browser in response to carefully crafted messages transmitted to a browser.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
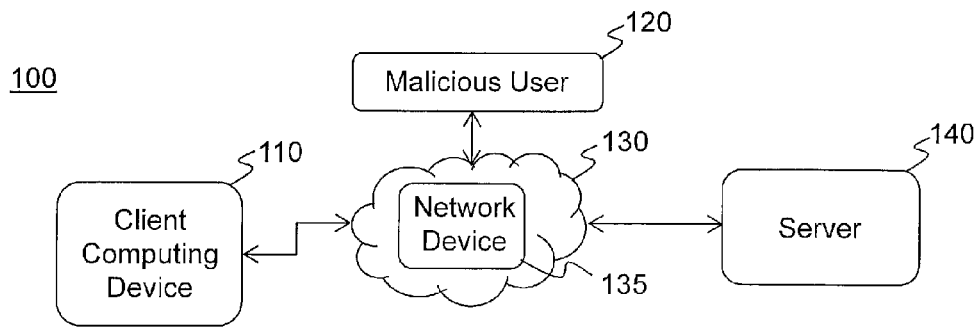
FIG. 1 is a schematic diagram of a client computing device communicating with a server by way of a network device according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to "one implementation," "an implementation," "one embodiment," "an embodiment" and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals, and/or the like. It should be understood, however, that all of these or similar terms are to be associated with appropriate physical quantities and are intended to merely be convenient labels.

Likewise, in this context, the terms "coupled," "connected," and/or similar terms, may be used. It should be understood that these terms are not intended as synonyms.

Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term "coupled" may also be understood to mean indirectly connected, for example, in an appropriate context.

The terms, "and," "or," "and/or," and/or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality or some other combination of features, structures and/or characteristics. Though it should be noted that this is merely an illustrative example and claimed subject matter is not limited to this example. Again, particular context of description or usage may provide helpful guidance regarding inferences to be drawn.

It should be understood that for ease of description, a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term "network device" refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including among wireless devices coupled via a wireless network, for example. It is noted that the terms, server, server device, server computing device, server computing platform, and/or similar terms are used interchangeably. Similarly, the terms "client," "client device," "client computing device," "client computing platform," and/or similar terms are also used interchangeably. While in some instances, for ease of description, these terms may be used in the singular, such as by referring to a "client computing device" or a "server device," or a "server" the description is intended to encompass one or more client devices or one or more devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term "transparent" refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long-haul public networks that, for example, may allow signal packets to be communicated between LANs. The term world wide web (WWW) and/or similar terms may also be used to refer to the Internet. Signal packets, also referred to as signal packet transmissions, may be communicated among nodes of a network, where a node may comprise one or more network devices, for example. As an illustrative example, but without limitation, a node may comprise one or more sites employing a local network address. Likewise, a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between or among devices in a network, typically network devices, but may include computing devices, as previously discussed; for example, devices that substantially comply with the protocol or that are substantially compatible with the protocol. In this context, the term "between" and/or similar terms are understood to include "among" if appropriate for the particular usage. Likewise, in this context, the terms "compatible with," "comply with" and/or similar terms are understood to include substantial compliance or substantial compatibility. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers.

In contrast, a virtual private network (VPN) may enable a remote device to communicate via a local network. A router may allow communications in the form of transmissions (e.g., signal packets), for example, to occur from a remote device to a VPN server on a local network. A remote device may be authenticated and a VPN server, for example, may create a special route between a local network and the remote device through an intervening router.

A network may be very large, such as comprising thousands of nodes, millions of nodes, billions of nodes, or more, as examples. Media networks, such as the Yahoo!™ network, for example, may be increasingly seeking ways to attract users to their networks and/or to retain users within their networks for extended periods of time. A media network may, for example, comprise an Internet website or group of websites having one or more sections. For instance, the Yahoo!™ network includes websites located within different categorized sections, such as sports, finance, current events, and games, to name just a few non-limiting examples among a variety of possible examples. To attract and/or retain users within its network, Yahoo!™ and/or other media networks may continually strive to provide content relating to categorized sections that may be interesting and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network, its partners, and/or subsidiaries. In an implementation, if a user displays a page, perhaps as a result of utilizing a search engine, a server (or other source) located within or external to a processing and/or communications infrastructure of a media network may deliver relevant content, which may include, for example, textual and/or multimedia content that may entice users to remain for a relatively extended period of time. Access, such as links to content (e.g., such as hyperlinks to websites located outside of a media network), may also be presented to users. Thus, even if users are directed to websites outside of a particular media network, users may remain loyal to the media network in the future if they believe that the network consistently provides access, such as links, or otherwise directs them to relevant and/or useful content. In this context, the term "content" includes, as examples, images, video, audio, text, and/or multimedia, such as in the form of stored physical (e.g., memory) states or in the form of electronic signals, for example.

As a non-limiting example, responsive to a client computing device submitting an access request to a server, for example, or as a result of any other type of attempt to interact with a server, a server may respond with one or more pages (e.g., web pages), for example. In an implementation, a "cookie" (e.g., locally stored physical (e.g., memory) states capturing details regarding a website interaction) may be used to identify a client computing platform, including a computing device, to a server, for example. In embodiments, a cookie may permit a client computing device to access secure content, which may be defined as content that may be decoded only, for example, by one or more designated parties. Secure content may, for example, be stored or accessible to one or more publicly available servers. To reduce a possibility that a malicious third party may fraudulently intercept and/or misuse content, a cookie may be encrypted, by way of one or more encryption techniques, in a manner that enables message traffic to be conducted over unsecured networks, such as, the public Internet. In some embodiments, two or more encrypted cookies may form, for example, a "credential" which may be used not only to authenticate a particular client computing device, but may also serve to validate one or more particular individuals using a client computing device. Use of a credential comprising two or more cookies may be advantageous if using a website for engaging in transfers of financial assets, for example, providing secure access (e.g., accessible only by one or more parties in possession of a credential) to medical records, and/or for performing other types of sensitive transactions.

In embodiments, one or more lossless compression techniques may be used to reduce communications channel bandwidth that may be employed in conveying messages among client devices and/or servers. In one possible example, just to provide an illustration, the "DEFLATE" lossless compression process may be used to convey messages across a communications network. A compression process may operate by identifying repeated portions of a message and/or replacing one or more repeated portions with a pointer or a symbol, for example. A technique for performing compression may be described in detail in U.S. Pat. No. 5,051,745, titled "String Searcher and Compressor Using Same." However, claimed subject matter is intended to embrace a variety of compression techniques, such as Lempel Ziv (e.g., LZ77, LZ78, LZW, LZSS, LZMA, etc.), gzip, and any other lossless compression technique, without limitation. Further, it should be noted that compression may occur prior to encryption of one or more messages, or may occur after message compression, and claimed subject matter is not limited in this respect.

In one or more embodiments, attempts at gaining access to a server by a malicious user, for example, may be made more difficult, and/or may be precluded entirely, by way of an insertion of one or more variable-length countermeasures strings into a cookie or other portion of a credential sent by a client device. Attempts, for example, may involve one or more malicious users acting to bring about client HTTP requests using a series of "attack strings." For certain attack strings of a series, for example, a malicious user may determine that an encrypted, compressed message from a browser, responsive to receiving an attack string of the series, may comprise a difference in length compared with a response to a different attack string of the series. Differences in length may provide undesirable insight into content of an encrypted, compressed cookie and/or other type of credential. Through a careful use of a progression of a series of attack strings, a malicious user may, over time, determine contents of one or more encrypted, compressed cookies and/or other types of user credentials. It should be noted that use of attack strings may be useful in determining contents of other types of compressed messages, and claimed subject matter is not limited to any particular compression process such as "DEFLATE," for example.

As described herein, one or more variable-length countermeasures strings may provide a layer of additional security that may be effective in defeating or at least complicating attempts by malicious users to determine components of one or more cookies through successive attack strings. In other embodiments, one or more variable-length countermeasures strings may be conveyed from a server to a client device, encrypted and compressed by a browser executing on one or more processors of a client device, and returned to a server perhaps in addition to other content. Under control of a server, for example, subsequent transmissions from a browser may include messages of varying length that do not provide potentially harmful insight into content of an encrypted, compressed authenticating credential, such as a cookie. Accordingly, at least in particular embodiments, a malicious user may be unable to make use of one or more series of attack strings to engage in decoding a cookie and thereby be permitted to engage in fraudulent activity that may give rise to financial harm to individuals, public and private institutions, governments, etc.

In a particular embodiment, a computing platform may comprise one or more computing devices that may generate electrical signals for inserting at least one variable-length countermeasures string into a credential, which may comprise two or more encrypted cookies, for example, and may be used to identify a client to a server. At least occasionally, a length of one or more variable-length countermeasures strings may be varied among subsequent transmissions from the server, such as, for example, with every transmission, every other transmission, every third transmission, or any other regular or irregular number of subsequent transmissions. In an embodiment, a computing platform, or other type of computing device, may perform a method comprising generating electronic signals that result, at least in part, in at least one variable-length countermeasures string that forms at least a portion of one or more cookies. Cookies may be used to authenticate a user, for example, to a server, wherein the variable-length countermeasures string at least occasionally varies in length among transmissions.

In embodiments, a further layer of security may be realized by inserting a variable-length padding string into messages conveyed from a server to a client device. A variable-length padding string may further confound, or may preclude entirely, a malicious user's ability to observe changes in length of messages conveyed from a server to a client as a technique of gaining insight into secure message content, for example. In some embodiments, one or more variable-length countermeasures strings and/or one or more variable-length padding strings may comprise random characters, pseudorandom characters, and/or characters that otherwise vary with little or no predictability among subsequent messages. In embodiments, lengths of variable-length countermeasures strings and/or variable-length padding strings may comprise random lengths, pseudorandom lengths, or may otherwise be made to vary in length with little or no predictability. Random and/or pseudorandom numbers may be generated using one or more computational techniques for generating sequences of numbers that approximate the properties of random numbers. Techniques for random and/or pseudorandom number generation may comprise computational techniques Monte Carlo methods, linear congruential generators, lagged Fibonacci generators, one or more linear feedback shift registers, Fortuna techniques, Mersenne Twister techniques, and so forth. Techniques for random and/or pseudorandom number generation may also comprise measurement of unpredictable physical phenomena such as atmospheric noise, electrical noise, and so forth.

FIG. 1 is a schematic diagram 100 of a client computing device communicating with a server by way of a network device according to an embodiment. In FIG. 1, client computing device 110 may comprise any type of computing device, such as a desktop or laptop computer, tablet, smart phone, or other type of personal computing device capable of accessing network 130. Client computing device 110 may include one or more peripheral devices, such as a keyboard, mouse, and/or other device or devices, which may be employed to communicate with server 140. In one or more implementations, client computing device 110 and server 140 may communicate via a network, such as network 130, which may represent the Internet, a corporate network, the "cloud," and/or any other type of wired and/or wireless network (or combination thereof).

In a non-limiting illustration, client computing device 110 may comprise one or more processing units capable of executing software code, for example, resulting in compressing and/or encrypting, as well as decompressing and/or decrypting, one or more cookies, or other authenticating messages that may be received from or transmitted to server 140. Message traffic, which may comprise cookies and/or other electronically generated files, may be communicated (e.g., transmitted) from server 140 to client computing device 110 by way of intervening network 130 and, in particular, through network device 135. It should be noted, however, that the particular arrangement of FIG. 1 illustrates but one of a host of various possible architectures capable of being employed to compress and/or decompress cookies, to encrypt and/or decrypt cookies. It should be noted that although the example of FIG. 1 specifically addresses cookies as they may comprise a technique of authenticating and/or providing credentials to server 140, for example, the example of FIG. 1 may pertain to other types of messages, and claimed subject matter is, of course, not limited in this respect.

In general, server 140 may recognize client computing device 110 using one or more cookies, which may comprise a relatively small file stored by way of a web browser executing on one or more processors of client computing device 110. Upon or after establishing a communications path, for example, between client computing device 110 and server 140, server 140 may convey one or more cookies to client device 110. In one possible example, if server 140 represents an e-commerce website, a user of client computing device 110 may enter shipping content, credit card content, preferences, and/or other customer-specific content during an initial visit to an e-commerce website. In implementations, if server 140 determines that desired customer information has been conveyed from client computing device 110 to an e-commerce website, for example, server 140 may convey one or more cookies to client computing device 110. Upon or after subsequent visits to server 140, server 140 may recognize client computing device 110, for example, by examining one or more cookies stored in memory locations accessible to a browser executing on client computing device 110.

In an implementation, such as that of FIG. 1, for example, malicious user 120 may attempt to access network device 135, which may represent a router, server, switch, and/or other device for enabling or assisting communications using network 130. Malicious user 120 may be located nearby network device 135, or may be positioned at a relatively remote location from network device 135, such as in another state or province as network device 135, or, for example, in another country entirely. In at least one implementation, a malicious user may attempt to surreptitiously obtain access to network device 135 using, for example, a stolen or otherwise misappropriated password, for example. In embodiments, network device 135 may be situated physically proximate with one or more of client computing device 110 and/or server 140, so that network traffic to and/or from client computing device 110, for example, passes through network device 135. However, it should be noted that claimed subject matter is intended to include placement of network device 135 at various locations within network 130.

Figure 2:
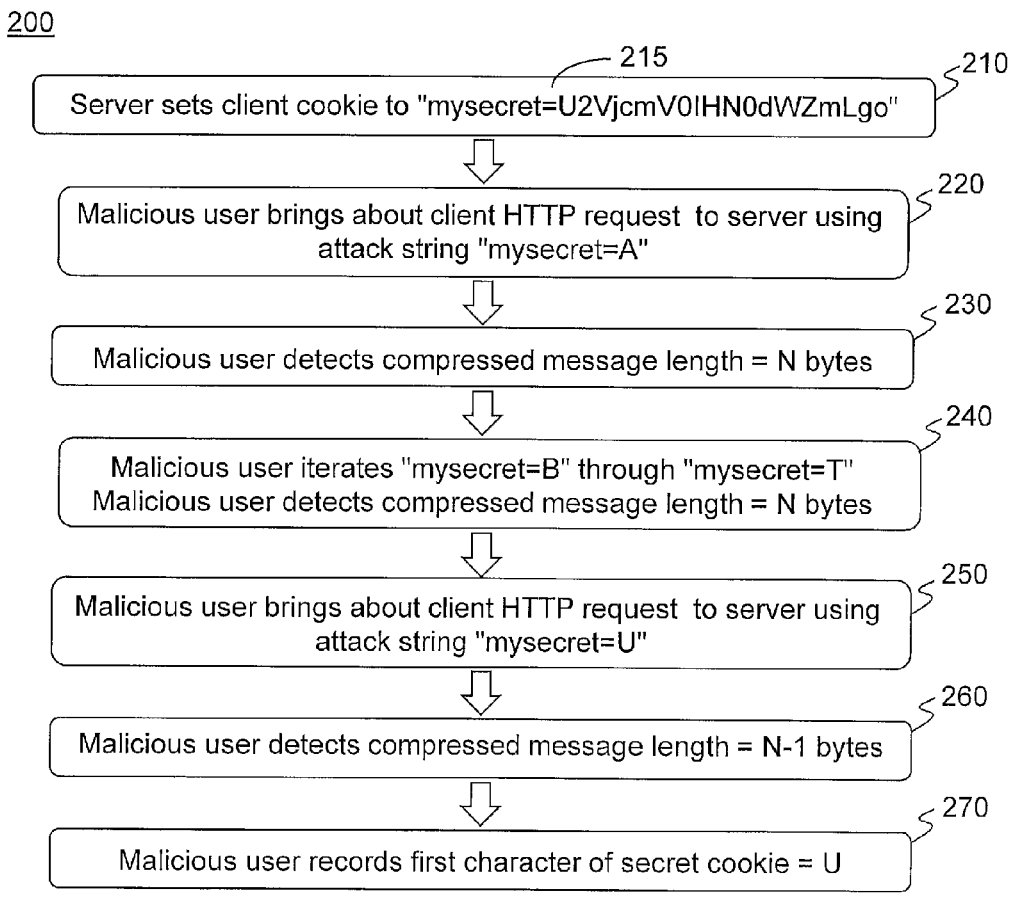
FIG. 2 is a flow diagram for a method of obtaining unauthorized access to a computing device, the likelihood of which may be reduced by way of one or more embodiments.

FIG. 2 is a flow diagram for a method embodiment 200 of obtaining unauthorized access to a computing device, the likelihood of which may be reduced by way of one or more embodiments in accordance with claimed subject matter. The method embodiment of FIG. 2 may be performed using the arrangement of FIG. 1, although alternative arrangements of computing devices, networks, network devices, servers, and so forth may be used, and claimed subject matter is not limited in this respect. The embodiment of FIG. 2 begins at block 210 in which a server may set a cookie of a client computing device, such as client computing device 110, to a selected value. In the example of FIG. 2, a cookie header, which may be used to identify a file as a cookie, may be identified, for example, using the header "mysecret=." In embodiments, a header may be followed by a secret "payload," for example, which, just for the sake of example, may be set to "U2VjcmV0IHN0dWZmLgo." In block 210, a web browser executing on a client computing device may store the received cookie as requested by a server.

At block 220, a malicious user, such as malicious user 120 of FIG. 1 may convey an attack string to a browser, such as a web browser executing on client computing device 110. An attack string, for example, may comprise a secret cookie header "mysecret=" followed by an initial guess at a first character "A" (e.g., "mysecret=A"). Responsive to receipt of the attack string, a browser executing on client computing device 110 may respond with an appropriate cookie (e.g., mysecret=U2VjcmV0IHN0dWZmLgo) and may return an attack string (e.g., mysecret=A) which may be used to identify client computing device 110 to server 140.

In embodiments, if client computing device 110, for example, encrypts a message comprising a secret cookie, malicious user 120 may detect transmission of one or more messages having unknown content. However, if a browser, for example, executing on client computing device 110 additionally employs a compression technique such as a DEFLATE, a browser may attempt to compress a message comprising an aggregated cookie having a header and secret payload (e.g., mysecret=U2VjcmV0IHN0dWZmLgo) and an attack string, such as "mysecret=A". Accordingly, although header information "mysecret=" may represent a compressible component of both a secret cookie and a repeated attack string, additional compression may not be possible. Accordingly, malicious attacker 120 may observe a relatively static-sized encrypted, compressed message N bytes in length, as shown in block 230.

At block 240, a malicious user, such as malicious user 120 of FIG. 1, may continue to present attack strings to client computing device 110, using, for example, "mysecret=B," "mysecret=C," through "mysecret=T". In an embodiment, for example, attack strings "mysecret=B" through "mysecret=T" do not comprise a first character in common with the secret cookie "mysecret=U2VjcmV0IHN0dWZmLgo." Accordingly, additional compression may not be possible, and attack strings "mysecret=B" through "mysecret=T" may result in encrypted, compressed messages from client computing device 110, for example, having a length of N bytes.

However, at block 250, if a malicious user, such as malicious user 120 of FIG. 1, attempts an attack string "mysecret=U," client computing device 110, for example, may respond with an encrypted, compressed message in which a noticeable change in message length may be observed. In embodiments, if an observer, such as malicious user 120, observes a change in message length of an encrypted, compressed response message, such as from N bytes to N−1 bytes, such as at block 260, a malicious user may determine that a first character of a secret cookie "mysecret=U2VjcmV01HN0dWZmLgo" may comprise "U." Thus, at block 270, a malicious user may record that a first character of a secret cookie equals "U." A malicious user may then repeat method 200 using a second series of attack strings, beginning with, for example, "mysecret=UA" and observing a length of an encrypted, compressed message from a browser executing on a computing device, such as client computing device 110 of FIG. 1. A malicious user may iteratively enter attack strings, "mysecret=UB" through "mysecret=UZ," and continuing with "mysecret=U1," and may observe an encrypted, compressed message from client computing device 110 comprising a length of N−1 bytes. However, if malicious user 120, for example, enters an attack string "mysecret=U2," for example, a malicious user may detect a change in length of an encrypted, compressed response message from client computing device 110. If a change in the length of an encrypted, compressed response message from the client computing device is observed, such as from N−1 bytes to N−2 bytes, a malicious user may record that a second character of the secret cookie equals "2." A malicious user may then initiate additional series of attack strings, until subsequent or even all characters of the secret cookie are detected by way of observing changes in encrypted, compressed messages from client computing device 110.

Figure 3:
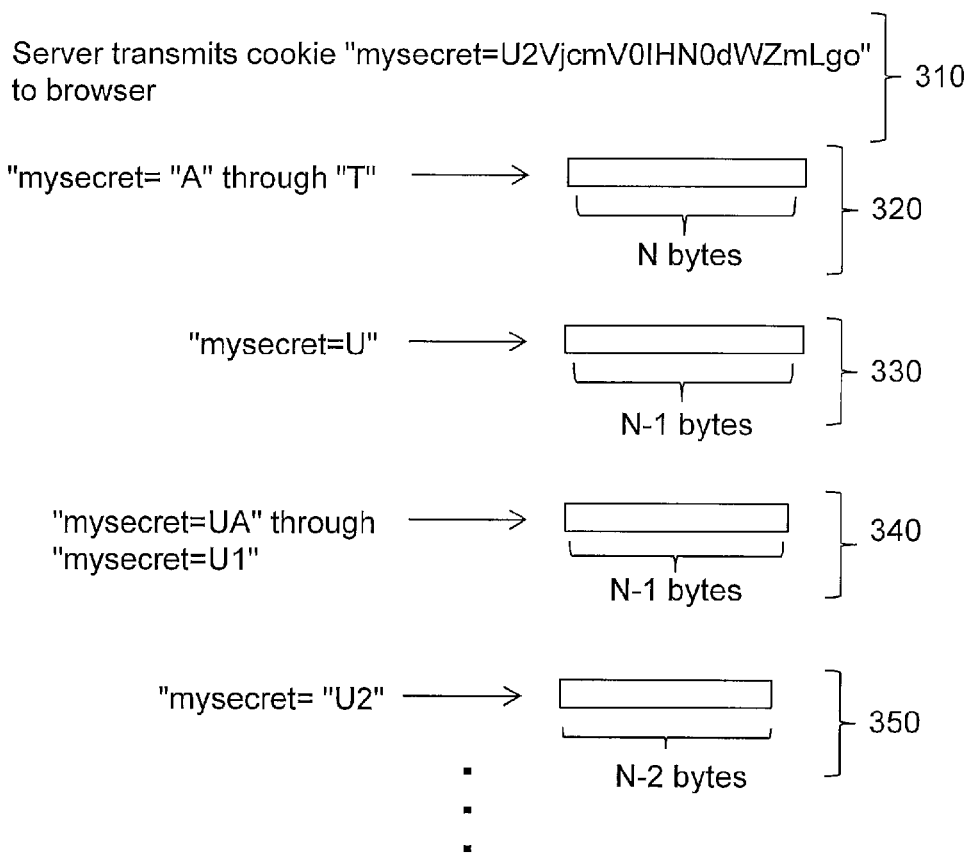
FIG. 3 is a diagram summarizing a browser's response to one or more attack strings described with reference to FIG. 2.

FIG. 3 is a diagram 300 to illustrate a browser's response to attack strings, described with reference to FIG. 2. For example, at 310, a server, such as server 140 of FIG. 1, may transmit a secret cookie for use by a browser, such as a browser executing on client computing device 110. At 320, in response to a series of attack strings such as "mysecret=A," "mysecret=B," through "mysecret=T," a browser may respond with an encrypted, compressed message having relatively static length of, for example, N bytes. At 330, an attack string of "mysecret=U," which comprises a first character of secret cookie "mysecret=U2VjcmV0IHN0dWZmLgo," may give rise to an encrypted, compressed response message from a browser having a length of, for example, N−1 bytes. If a shortened (e.g., from N byte to N−1 byte) response message from a browser is detectable, a malicious user may determine that a first character of the secret cookie equals "U." At 340, a malicious user may initiate attacks using a second series of attack strings, such as "mysecret=UA," "mysecret=UB," "mysecret=UC," etc. In response, a browser may transmit an encrypted, compressed message of a length of, for example, N−1 bytes, thereby indicating that an attack string comprises a character in common with the secret cookie. At 350, if an attack string "mysecret=U2" is conveyed to a client computing device, for example, a browser executing on a client computing device may respond with a somewhat shortened encrypted, compressed message having a length of, for example, N−2 bytes. If a malicious user observes a shortened encrypted, compressed response message (e.g., from N−1 to N−2 bytes), a malicious user may determine a second character of a secret cookie equals "2." A malicious user may continue with additional attack strings, such as, for example, "mysecret=U2A" in an attempt to observe a third change in length of an encrypted, compressed response message, and so on.

Figure 4:
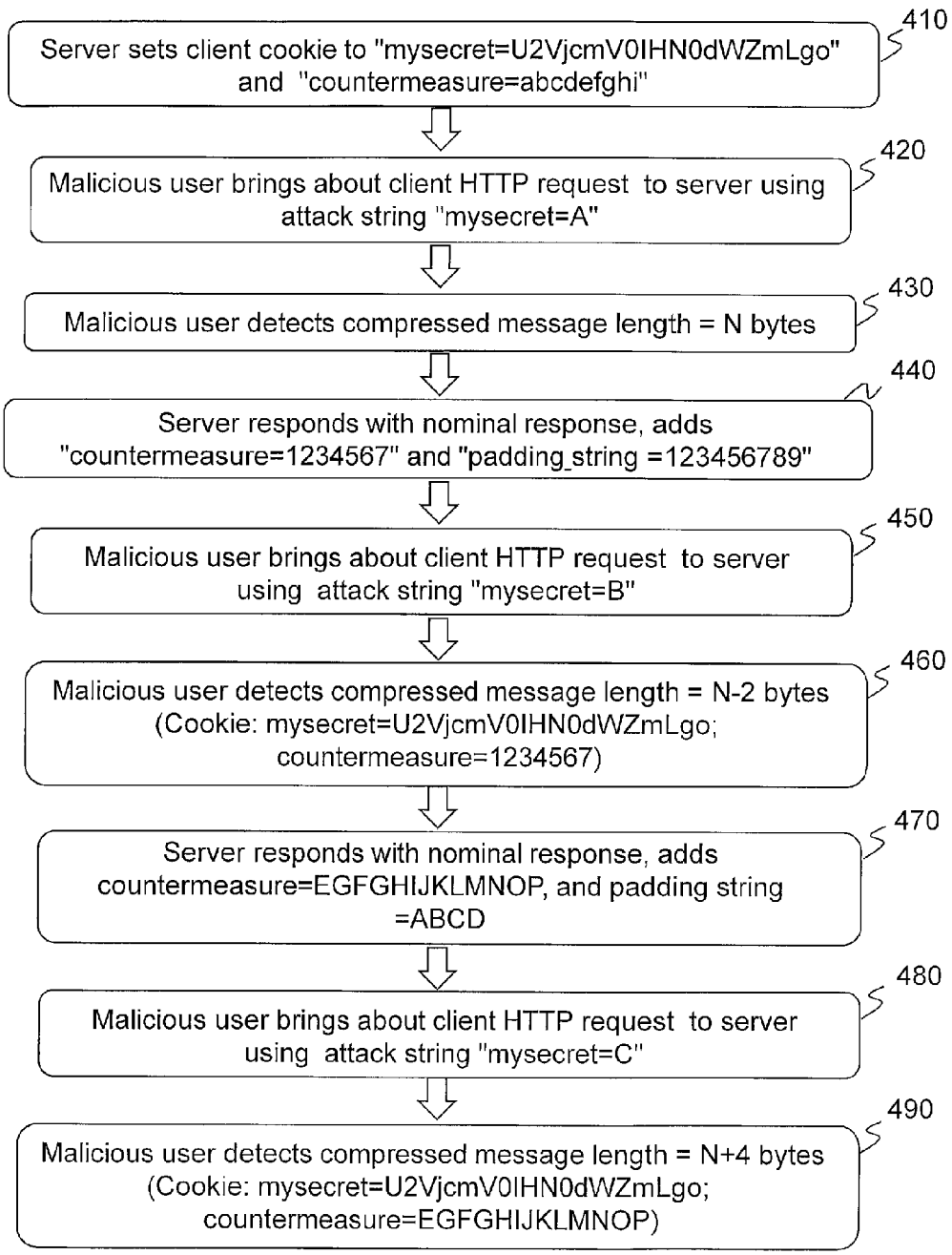
FIG. 4 is a flow diagram of a method for enhancing network security according to an embodiment.

FIG. 4 is a flow diagram of a process for enhancing network security according to an embodiment. The method of FIG. 2 may be performed using the arrangement of FIG. 1, although alternative arrangements of computing devices, networks, network devices, servers, and so forth may be used, and claimed subject matter is not limited in this respect. To perform the method embodiment of FIG. 4, server 140 may be programmed to execute a somewhat different set of computer-implemented instructions, which may, in general, enable a server to convey one or more variable-length countermeasures strings to a client computing device, such as client computing device 110 of FIG. 1, for example. In some embodiments, a server may additionally convey one or more padding strings to a client computing device.

At block 410, a server may set a secret client cookie to a particular value such as, for example, "mysecret=U2VjcmV0lHN0dWZmLgo," as well as setting an additional variable-length countermeasures string, such as, for example, "countermeasure=abcdefghi," which, in this example, comprises 9 alphanumeric characters. In embodiments, an additional variable-length countermeasures string may comprise pseudorandom, random, and/or an otherwise unpredictable group of alphanumeric characters perhaps through use of a random number generator executing on a processor of client computing device 110. Further, a variable-length countermeasures string of block 410 may comprise a random, pseudorandom, and/or otherwise relatively unpredictable number of alphanumeric characters, the length of which may be determined, for example, as a result of a random number generation process as well. At block 420, a malicious user may form one or more attack strings, such as, for example, "mysecret=A," in an attempt to bring about an encrypted, compressed response message of a particular, relatively static length. At block 430, a malicious user may detect one or more encrypted, compressed response messages from a browser having a length of, for example, N bytes.

At block 440, a server may transmit a response to a client computing device comprising a previously transmitted secret cookie (e.g., "mysecret=U2VjcmV0lHN0dWZmLgo") and may additionally transmit a variable-length countermeasures string that is different from a previously transmitted variable-length countermeasures string. In 440, for example, a variable-length countermeasures string "countermeasure=1234567," which comprises 7 alphanumeric characters, for example may be transmitted from a server to a client computing device. (Thus, the countermeasures string of block 440 differs from the countermeasures string of block 410 by 2 alphanumeric characters.) In response to receiving one or more variable-length countermeasures strings, a client computing device may be prepared to return an encrypted, compressed version of the variable-length countermeasures string, along with an encrypted, compressed secret cookie. (Padding_string=123456789 will be discussed separately herein.)

At block 450, a malicious user may form an attack string comprising, for example, "mysecret=B." Responsive to receipt of an attack string (e.g., "mysecret=B") a client computing device, for example, may respond with an encrypted, compressed message comprising an aggregate of a secret cookie (e.g., "mysecret=U2VjcmV0lHN0dWZmLgo"), as well as an encrypted, compressed countermeasures string of suitably random alphanumeric characters, such as, for example "countermeasure=1234567." Thus, an observer, such as malicious user 120, may detect a difference in length of an encrypted, compressed message transmitted by client computing device 110, for example. For the example at hand, a malicious user may detect, at block 460, that the encrypted, compressed message most recently transmitted from a client computing device 110 comprises N−2 bytes, as opposed to N bytes observed at block 430, for example.

Responsive to receipt of a secret cookie and a variable-length countermeasures string, a server, such as server 140 of FIG. 2, may respond with a secret cookie, for example at block 470, and one or more variable-length countermeasures strings, such as "countermeasure=EGFGHIJKLMNOP," which may represent 13 randomly and/or pseudorandomly selected alphanumeric characters, for example. In response to receiving one or more variable-length countermeasures strings, a client computing device may be prepared to return an encrypted, compressed version of the variable-length countermeasures string, along with an encrypted, compressed secret cookie. Accordingly, responsive to receipt of a third attack string, such as, for example, "mysecret=C," such as at block 480, a malicious user may observe an encrypted, compressed message transmitted from a client computing device comprising N+4 characters. An encrypted, compressed message transmitted from client computing device 110 may be observed by a malicious user, for example at block 490, in response to receiving a variable-length countermeasures string comprising the 13 previously received alphanumeric characters.

Returning to blocks 440 and 470, in some embodiments, one or more padding strings may additionally be conveyed from server 140, for example, to a client computing device, such as client computing device 110 of FIG. 1. In embodiments, one or more padding strings may be transmitted by a server and ignored by client computing devices, for example, such as via software being executed. Use of use of one or more padding strings may enable an additional level of security by modifying a relationship between messages transmitted to a client computing device and messages transmitted from a client computing device, for example. In the example of FIG. 4, at block 440, an observer, such as malicious user 120 of FIG. 1, may observe an encrypted, compressed message transmitted from a server comprising a length suitable for accommodating a 19-character cookie, a 7-character variable-length countermeasures string, and a 9-character padding string. Thus, an encrypted message may comprise a length of, for example, at least 35 characters (i.e., 19+7+9=35). However, in this instance if a padding string is not returned by a client computing device, an observer, such as malicious user 120 of FIG. 1, may observe an encrypted, compressed message comprising a length of only 26 characters (i.e., 19+7=26).

Further, at block 470, for example, a server may transmit one or more padding strings comprising, for example, 4 characters, which may form a message comprising a length of at least 30 characters (19+7+4). If, a client computing device does not return a padding string, an observer may detect an encrypted, compressed message from a client comprising a length of 26 characters. Accordingly, in embodiments, use of an optional, variable-length padding string may further complicate efforts by malicious users to gain insight into contents of an encrypted, compressed message, for example.

In embodiments, variable-length padding strings may comprise pseudorandom, random, and/or otherwise relatively unpredictable alphanumeric characters. Alphanumeric characters may be generated, for example, using a random number generator executing at server 140. Additionally, a length of variable-length padding strings may be determined in a random, pseudorandom, or other unpredictable manner. Thus, for example, at block 440, a padding string comprising 9 characters may be used. However, a random number generating technique may bring about a 3-character padding string of unpredictable alphanumeric characters, a 15-character padding string of unpredictable characters, or may produce a string of any other length comprising unpredictable alphanumeric characters, and claimed subject matter is not limited in this respect.

Figure 5:
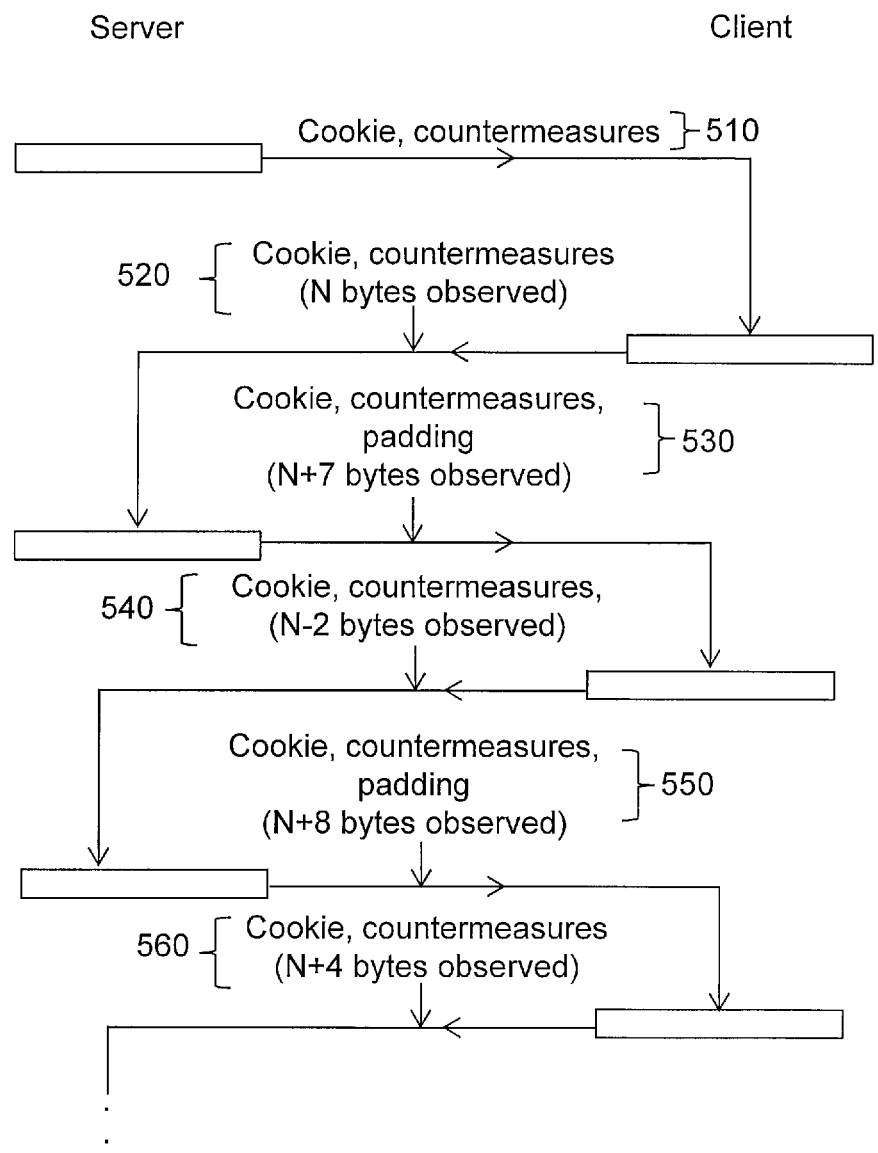
FIG. 5 is a flow diagram summarizing message traffic between a server and a client computing device according to an embodiment.

FIG. 5 is a flow diagram 500 illustrating message traffic between a server and a client computing device according to an embodiment. The method embodiment of FIG. 5 may be performed using the arrangement of FIG. 1, although alternative arrangements of computing devices, networks, network devices, servers, and so forth may be used, and claimed subject matter is not limited in this respect. At 510, a server, such as server 140 of FIG. 1, may transmit one or more encrypted, compressed cookies and one or more variable-length countermeasures strings to a client. At 520, perhaps in response to receiving an attack string from a malicious user, a client may transmit one or more encrypted, compressed messages to a server. An observer, such as a malicious user, may detect a message length of, for example, N bytes.

At 530, a server may generate a different variable-length countermeasures string and a variable-length padding string for transmission, for example, to a client computing device. Variable-length countermeasures strings and/or variable-length padding strings may comprise a random, pseudorandom, and/or otherwise unpredictable length, as well as comprising a random, pseudorandom, or otherwise unpredictable group of alphanumeric characters. Responsive to variable-length countermeasures strings and/or variable-length padding strings, an observer, such as a malicious user, for example, may observe a number of bytes equal to, for example, N+7 bytes. At 540, perhaps in response to receiving an attack string, a client may respond with an encrypted, compressed message comprising, for example, N−2 bytes, wherein a variable-length padding string is not returned from a client computing device. At 550, a server may transmit a cookie, a variable-length countermeasures string, and/or a variable-length padding string for use by a client. At 560, perhaps in response to a client to receiving an attack string, for example, a client computing device may respond by transmitting one or more encrypted, compressed messages of a length comprising, for example, N+4 bytes in which a variable-length padding string is not returned.

Figure 6:
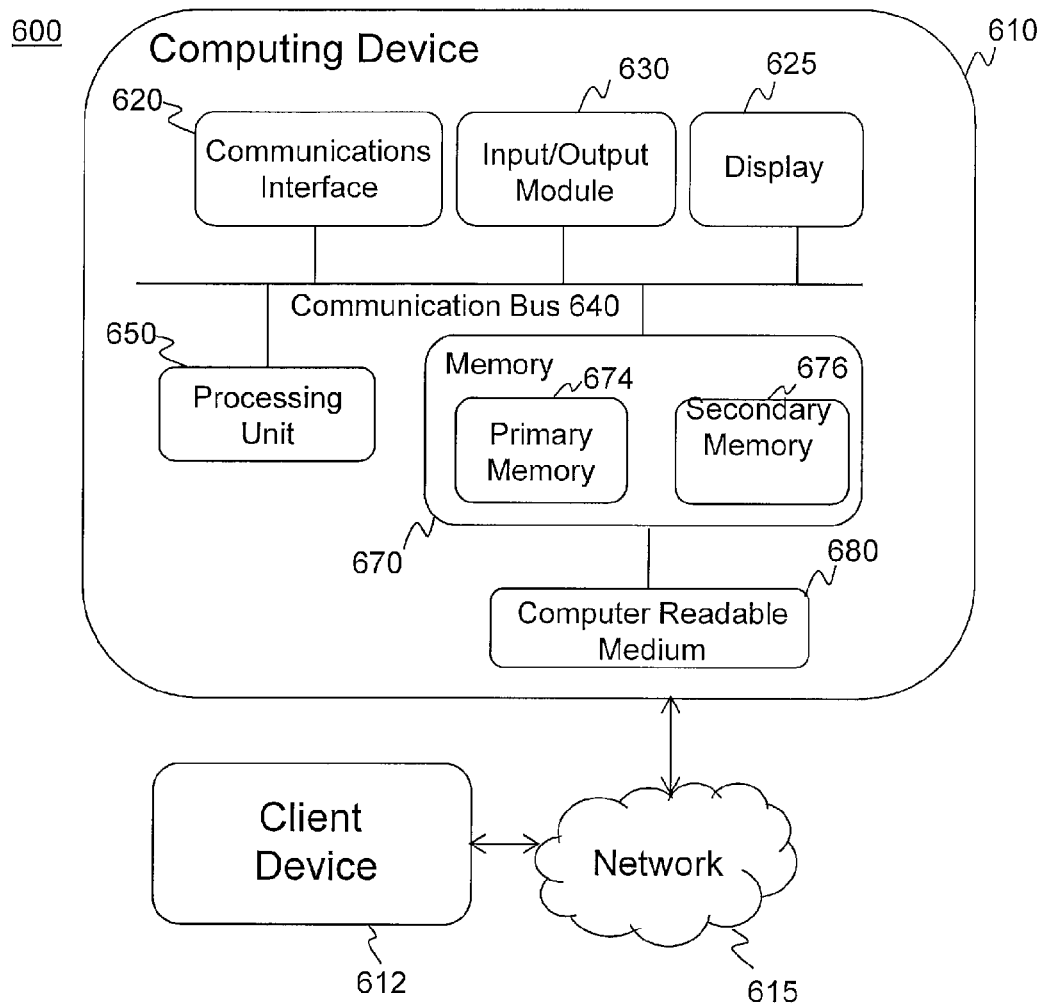
FIG. 6 is a schematic diagram of a computing platform that may be employed to enhance network security according to an embodiment.

It should be noted that for the examples of FIGS. 5 and 6, variable-length countermeasures strings and variable-length padding strings may be modified in length and/or content with subsequent transmissions from a server and/or from a client computing device. However, in other embodiments, padding strings and/or countermeasures strings may not be modified with subsequent transmissions. Thus, in some embodiments, one or more of a variable-length countermeasures string and/or a padding string may be altered every second transmission, every third transmission, every fourth transmission, or at any other regular or irregular interval. Additionally, randomized content of countermeasures and/or padding strings may be modified every second transmission, every third transmission, or at any other regular or irregular interval. Thus, claimed subject matter is intended to embrace modifications in length and/or content of variable-length countermeasures strings and padding strings, without limitation.

For purposes of illustration, FIG. 6 is a schematic diagram 600 of a computing platform that may be employed for enhancing security instructions according to an embodiment. The computing platform of FIG. 6 may comprise computing device 610 that may be employed to perform functions described herein. In FIG. 6, computing device 610 may interface with client device 612, which may comprise features of a conventional client computing device, such as client computing device 110 of FIG. 1, for example. Communications interface 620, processor (e.g., processing unit) 650, and memory 670, which may comprise primary memory 674 and secondary memory 676, may communicate by way of communication bus 640, for example. In FIG. 4, computing device 610 may store various forms computer-implementable instructions, by way of input/output module 630, for example, such as those that direct operation of search engines, perform financial transactions, access medical records, provide access to databases comprising trade secrets, process credit card transactions, and claimed subject matter is not limited in this respect. Client computing device 612 may communicate with computing device 610 by way of an Internet connection via network 615, for example. Although the computing platform of FIG. 6 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter be limited in scope to illustrative examples.

Processor 650 may be representative of one or more circuits, such as digital circuits, to perform at least a portion of a computing procedure or process. By way of example but not limitation, processor 650 may comprise one or more processors, such as controllers, microprocessors, microcontrollers, application specific integrated circuits, digital signal processors, programmable logic devices, field programmable gate arrays, and the like, or any combination thereof. In implementations, processor 650 may perform signal processing to manipulate signals or states or to construct signals or states, for example.

Memory 670 may be representative of any storage mechanism. Memory 670 may comprise, for example, primary memory 674 and secondary memory 676, additional memory circuits, mechanisms, or combinations thereof may be used. Memory 670 may comprise, for example, random access memory, read only memory, or one or more data storage devices or systems, such as, for example, a disk drive, an optical disc drive, a tape drive, a solid-state memory drive, just to name a few examples. Memory 670 may be utilized to store a program, as an example. Memory 670 may also comprise a memory controller for accessing computer readable-medium 680 that generate electronic signals that may result in generating of encrypted and/or compressed secure cookies, variable-length countermeasures and padding strings that may be used to authenticate a client to a server. Under the direction of processor 650, memory, such as cells storing physical states, representing for example, a program, may be executed by processor 650 and generated signals may be transmitted via the Internet, for example. Processor 650 may also receive digitally-encoded signals from computing device 610.

Network 615 may comprise one or more communication links, processes, and/or resources to support exchanging communication signals between a client and server, which may, for example, comprise one or more servers (not shown). By way of example, but not limitation, network 615 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing platform," as used herein, refers to a system and/or a device, such as a computing device, that includes a capability to process and/or store data in the form of signals and/or states. Thus, a computing platform, in this context, may comprise hardware, software, firmware, or any combination thereof (other than software per se). Computing platform 610, as depicted in FIG. 6, is merely one such example, and the scope of claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 670 may store cookies relating to one or more users and may comprise a computer-readable medium that may carry and/or make accessible content, code and/or instructions, for example, executable by processor 650 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated among devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

What is claimed is:

1. An apparatus, comprising:
   at least one server, via at least one hardware processor, to generate electrical signals to represent at least one compressed variable-length countermeasures string for insertion into a network transmission response to a client that has attempted to gain access to secure content and to vary at least a length of the at least one compressed variable-length countermeasures string among a network transmission response to the client, a payload portion of the compressed variable-length countermeasures string to be based, at least in part, on whether one or more characters of an attack string are in common with a browser cookie, the at least one compressed variable-length countermeasures string, and a padding string, to be inserted into network transmission responses comprising one or more cookies, the padding string to be varied in length at increments of network transmission responses.

2. The apparatus of claim 1, the at least one server additionally to:
   generate electrical signals to represent random or pseudorandom states for insertion into at least a portion of the at least one compressed variable-length countermeasures string.

3. The apparatus of claim 1, wherein the at least one compressed variable-length countermeasures string to be varied at increments of network transmission responses.

4. The apparatus of claim 3, wherein the increments to comprise regular increments.

5. The apparatus of claim 3, wherein the increments to comprise irregular increments.

6. The apparatus of claim 1, wherein the at least one compressed variable-length countermeasures string to comprise a at least one variable-length countermeasures string to be inserted into a header portion of the network transmission response.

7. The apparatus of claim 1, wherein the increments to comprise regular increments.

8. The apparatus of claim 1, wherein the increments to comprise irregular increments.

9. The apparatus of claim 1, wherein the at least one server is further to process secure financial transactions, medical records transactions, credit card transactions, transactions involving trade secrets, or any combination thereof.

10. A method comprising:
    generating electronic signals that result, at least in part, in at least one compressed variable-length countermeasures string that forms at least a portion of a network transmission response to a network transmission authenticating a client for access to secure content, the at least one compressed variable-length countermeasures string varies among a series of network transmission responses, a payload portion of the compressed variable-length countermeasures string based, at least in part, on whether one or more characters of an attack string are in common with a browser cookie, the at least one compressed variable-length countermeasures string, and a padding string, to be inserted into network transmission responses comprising one or more cookies, the padding string to be varied in length at increments of network transmission responses.

11. The method of claim 10, wherein the at least one compressed variable-length countermeasures string varies with each network transmission response in the series.

12. The method of claim 10, wherein the at least one compressed variable-length countermeasures string varies in the series substantially in accordance with a computational technique for generating random or pseudorandom values.

13. The method of claim 10, wherein the increments comprise regular increments.

14. The method of claim 10, wherein the increments comprise irregular increments.

15. An article comprising:
    a non-transitory storage medium comprising instructions stored thereon executable by a special-purpose computing apparatus to generate electrical signals to represent at least one compressed variable-length countermeasures string, and a padding string, to be inserted into a network transmission response to a client that has attempted to gain access to secure content and to vary at least a length of the at least one compressed variable-length countermeasures string among network transmission responses to the client, a payload portion of the compressed variable-length countermeasures string to be based, at least in part, on whether one or more characters of an attack string are in common with a browser cookie, the at least one compressed variable-length countermeasures string, and the padding string, to be inserted into network transmission responses comprising one or more cookies and to be varied in length at increments of network transmission responses.

16. The article of claim 15, wherein the instructions are further executable to generate random or pseudorandom states for insertion into at least a portion of the at least one compressed variable-length countermeasures string.

17. The article of claim 15, wherein the increments to comprise regular increments.

18. The article of claim 15, wherein the increments to comprise irregular increments.

19. The article of claim 15, wherein the at least one variable-length countermeasures string to be inserted into a header portion of the network transmission response.

20. The article of claim 15, wherein the at least one server is further to process financial transactions, medical records transactions, credit card transactions, transactions involving trade secrets, or any combination thereof.

* * * * *